United States Patent [19]

Walter et al.

[11] Patent Number: 4,477,802

[45] Date of Patent: Oct. 16, 1984

[54] ADDRESS GENERATOR FOR GENERATING ADDRESSES TO READ OUT DATA FROM A MEMORY ALONG ANGULARLY DISPOSED PARALLEL LINES

[75] Inventors: Chris J. Walter, Columbia, Md.; Gerald A. Brumm, Boca Raton, Fla.

[73] Assignee: The Bendix Corporation, Southfield, Mich.

[21] Appl. No.: 331,723

[22] Filed: Dec. 17, 1981

[51] Int. Cl.³ .............................................. G09G 1/16
[52] U.S. Cl. .................................... 340/727; 340/723; 340/731; 340/974
[58] Field of Search ................ 340/24, 27 R, 27 N, 340/723, 724, 726, 727, 731, 974, 975, 995

[56] References Cited

U.S. PATENT DOCUMENTS

| | | | |
|---|---|---|---|
| 3,470,542 | 9/1969 | Trantanella | 340/173 |
| 3,478,323 | 11/1969 | Rado | 340/173 |
| 3,925,765 | 12/1975 | Berwin et al. | 340/727 |
| 3,962,689 | 6/1976 | Brunson | 340/173 R |
| 3,973,243 | 8/1976 | Whiteside et al. | 340/172.5 |
| 4,024,493 | 5/1977 | Ingels | 340/796 |
| 4,228,432 | 10/1980 | Osborne | 340/727 |
| 4,245,321 | 1/1981 | Gennetten | 364/521 |
| 4,246,578 | 1/1981 | Kawasaki et al. | 340/750 |
| 4,249,172 | 2/1981 | Watkins et al. | 340/726 |
| 4,249,186 | 2/1981 | Edwards | 346/35 |
| 4,267,573 | 5/1981 | Chaikin et al. | 340/727 |
| 4,271,476 | 6/1981 | Lotspiech | 364/515 |
| 4,280,199 | 7/1981 | Osakabe et al. | 365/236 |
| 4,360,876 | 11/1982 | Girault et al. | 340/24 |

Primary Examiner—Marshall M. Curtis
Attorney, Agent, or Firm—James R. Ignatowski; Russel C. Wells; Anthony F. Cuoco

[57] ABSTRACT

An address generator responsible to input parameters for generating addresses to read out the content of a memory along parallel lines disposed at an angle to the orthogonal rows and columns of storage elements. The address generator has a first pair of registers coupled by an adder to generate line corrected X addresses, a second pair of registers coupled by an adder for generating first address corrections, an adder summing said line corrected X addresses with said first address corrections to generate X addresses, a third pair of registers coupled by an adder to generate line corrected Y addresses, a fourth pair of registers coupled by an adder to generate second address corrections, and an adder summing said line corrected Y addresses with said second address corrections to generate Y addresses.

15 Claims, 4 Drawing Figures

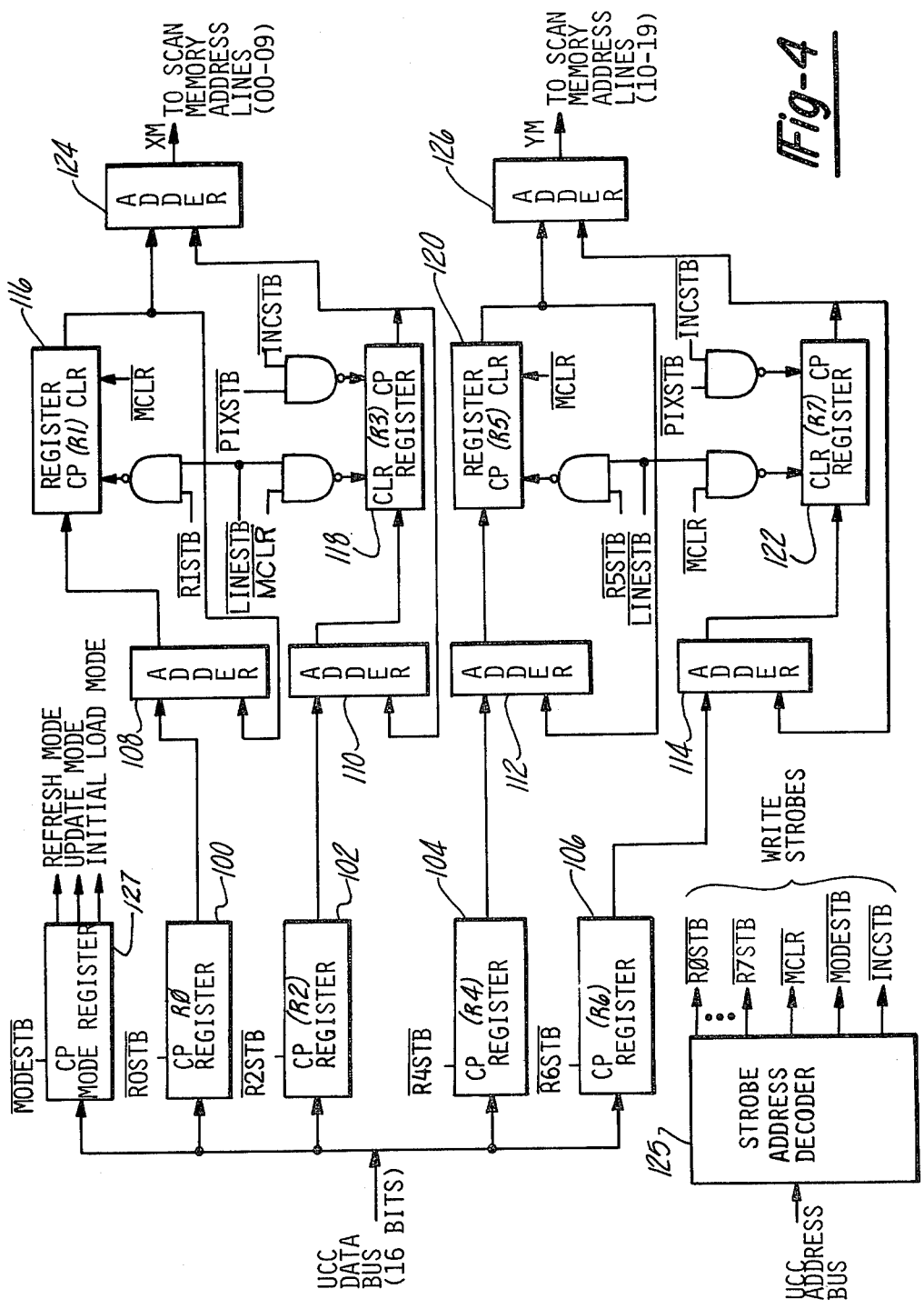

ADDRESS GENERATOR FOR GENERATING ADDRESSES TO READ OUT DATA FROM A MEMORY ALONG ANGULARLY DISPOSED PARALLEL LINES

BACKGROUND OF THE INVENTION

1. Field of the Invention

The invention relates to an address generator for generating addresses enabling a memory to output its stored data in a predetermined sequence and in particular to an address generator capable of generating addresses enabling a memory to output its data stored along parallel lines angularly disposed to the orthogonally arranged storage elements of the memory.

2. Prior Art

It is well known in the art, that image data can be electrically stored in an electronic memory such as a read only memory or random access memory. The memory stores individual pixels of image data in discrete storage elements disposed at the intersections of the orthogonally arranged rows and columns and each storage element has a unique address which defines its location. The address conventionally contains the identity of the row and column which contain the particular storage element.

A visual image of the information electrically stored in the memory is generated by sequentially addressing the individual storage elements along each row one row at a time from the top of the memory to its bottom in synchronization with the scan raster of a display device such as a cathode ray tube as taught by Evans et al in U.S. Pat. No. 4,179,693. Obviously the image may be inverted by addressing the individual storage elements in the reverse order from bottom to top or the image may be rotated by 90° by addressing the storage elements along the columns in the desired sequence.

Often it is desired to rotate the displayed image at an angle intermediate the four orthogonal positions discussed above. To achieve such an intermediate rotation of the image, the prior art as disclosed by Gennetten in U.S. Pat. No. 4,245,321, teaches a rotating raster generator. This rotating raster generator generates input signal to the cathode ray tube's deflection coils which rotate the raster of the cathode ray tube so that the scan lines are rotated with respect to the physical geometry of the cathode ray tube. This same effect could also be obtained by physically rotating the deflection coils as is known in the art. Rotation of the scan raster is generally only applicable to monochromatic display devices, such as a black and white cathode ray tube. Rotation of the scan raster is not applicable to multi-color displays such as a color cathode ray tube because it changes the relationship between the mutli-color dot pattern and the scan lines resulting in the loss of the color information.

In the field of photogrammetry where the stored image data is taken from a photographic image having known abberations and distortions, Whiteside et al in U.S. Pat. No. 3,973,243 teaches an address generator which generates addresses in the memory in a special order different from the order in which the data elements are stored in the memory to remove the known distortions. This address generator is incapable of addressing the memory along parallel lines angularly disposed to the orthogonal orientation of the rows and columns of storage elements.

The disclosed invention is an address generator capable of generating addresses which lie along parallel lines angularly disposed with respect to the orientation of the rows and columns of storage elements in the memory.

SUMMARY OF THE INVENTION

The invention is an address generator receiving input parameters from a computer which is capable of generating sequential addresses addressing the storage elements of a memory along parallel lines. The orientation of the parallel lines with respect to the orthogonally disposed rows and columns of the storage elements of the memory is determined by the input parameters from the computer.

The input parameters generated by the computer include the X and Y starting addresses defining the column and row respectively where the scan of the memory is to begin, a first and second incremental X axis correction value and a first and second Y axis correction value. A timing signal generator also generates sets of pixel strobe signals, each set containing a predetermined number of pixel strobe signals equal to the number of addresses to be generated along each of the parallel lines, and a line strobe signal marking the end of each set of pixel strobe signals. The address generator comprising: an X axis address generator means for sequentially generating X addresses in response to the X starting address, the first incremental Y, and first incremental X axis correction values and the pixel and line signals, and a Y axis address generator means for sequentially generating Y axis addresses in response to the X starting address, the second incremental Y and second incremental X axis correction values, and the pixel and line strobe signals.

This address generator may be used in conjunction with the computer to generate the addresses for the initial load of the memory or addresses to update the content of the memory with new data.

One advantage of the disclosed address generator is that it frees the computer to perform other functions while the addresses for scanning the memory are being generated. Another advantage of the disclosed address generator is that it is capable of generating address along parallel lines angularly disposed to the orthogonally disposed rows and columns of the memory storage elements. Still another advantage is that the address generator is capable of generating addresses within areas of different sizes within the confines of the memory. Another advantage is that the disclosed generator is capable of generating addresses enabling the computer to initially load the memory with blocks of data. Still another advantage of the address generator is that it is capable of generating addresses enabling the computer to update the content of the memory with new data one row or column at a time.

These and other advantages of the address generator will become apparent from a reading of the detailed description of the invention in conjunction with the appended figures.

BRIEF DESCRIPTION OF THE DRAWINGS

FIG. 4 shows the details of Address Generator 16.

DETAILED DESCRIPTION OF THE INVENTION

The invention is disclosed with reference to a moving map display system but it is applicable to any other system where it is necessary or desirable to extract and/or display the image stored in a memory at any angle.

Figure 1:
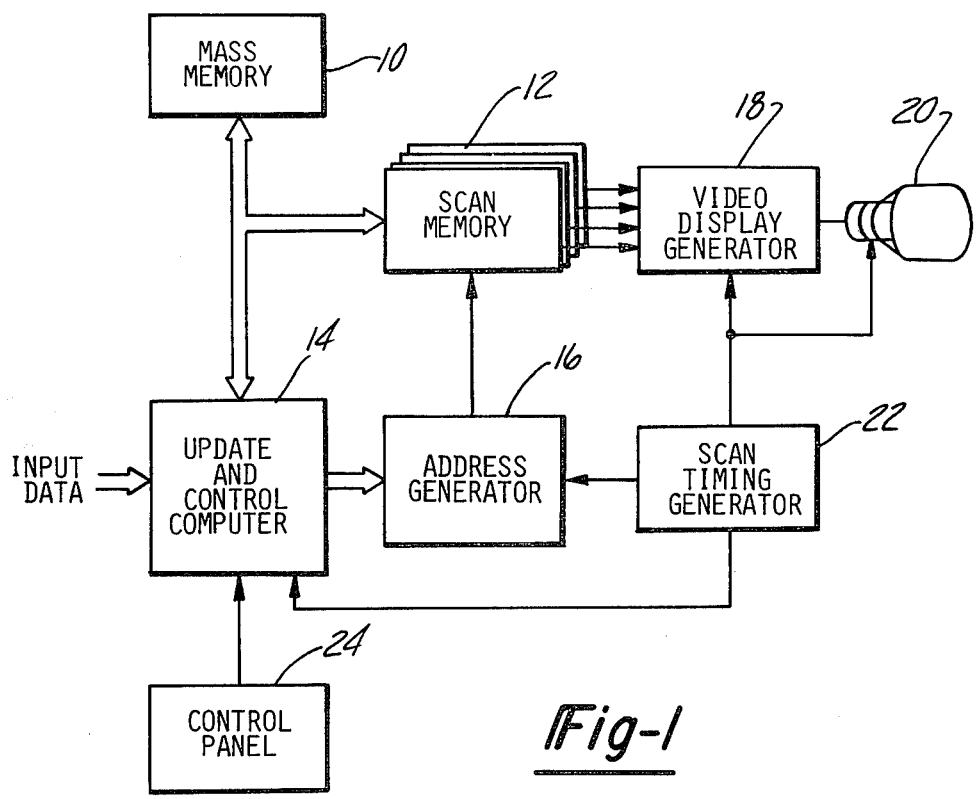
FIG. 1 is a block diagram of a moving map display system incorporating the disclosed address generator.

Referring to FIG. 1 there is shown a block diagram of a moving map display system incorporating the disclosed address generator. The moving map display system provides to the operator of the vehicle a visual map of the territory immediately surrounding the vehicle. The moving map display comprises a Mass Memory 10 storing digital image data representative of the area over which the vehicle is to be navigated. The moving map display further includes a Scan Memory 12 storing a segment or portion of the image data stored in the Mass Memory 10 indicative of the area immediately surrounding the vehicle which is to be displayed.

The image data stored in the Scan Memory 12 is systematically updated with new map data from the Mass Memory 10 with the movement of the vehicle. An Update and Control Computer 14 receives input data, including the coordinate position of the vehicle and the vehicles heading and determines when the map data stored in the Scan Memory 12 needs to be updated. The Update and Control Computer 14 then extracts the required new map data from the Mass Memory 10, computes the update parameters for an Address Generator 16 where the new map data is to be stored in the Scan Memory 12. The address Generator 16 in response to the update parameters received from the Update and Control Computer 14 sequentially generates the addresses where the new map data is to be stored in the Scan Memory 12. The Update and Control Computer 14 then in cooperation with the Address Generator 16 transfers the new map data to the Scan Memory 12 where it is stored at the generated addresses.

After the Scan Memory is updated with the new map data, the Update and Control Computer 14 then generates refresh parameters which are input to the Address Generator 16. The Address Generator 16 in response to the refresh parameters received from the Update and Control Computer and synchronization signals received from a Scan Timing Generator 22 generates addresses in a sequence which enables the Scan Memory 12 to output the stored map data to a Video Display Generator 18.

The Video Display Generator 18 converts the digital map data received from the Scan Memory 12 into analog map signals transmitted to a Display Device 20 illustrated as a cathode ray tube. The Scan Timing Generator 22 generates pixel strobe, line strobe and syncronization signals which syncronize the generation of the addresses generated by the Address Generator 16 with the generation of the horizontal and vertical scan signals by the Display Device 20. The pixel strobe and line strobe signals are received by the Address Generator 16 and are used in the generation of the addresses outputing the map data from the Scan Memory 12. The analog map signal and synchronization signals are received by a Display Device 20 which generates a visual image corresponding to the portion of map data output from the Scan Memory 12.

During the vertical retrace (return) of the Video Display's scan raster at the end of each displayed frame of map data the Scan Timing Generator 22 further generates a vertical blanking signal which deactivates the display during this interval. The Scan Memory 12 is updated during the vertical blanking signal one row or column at a time. In contrast the Display Device is refreshed by reading out the map data stored in the Scan Memory 12 between the blanking signals.

Figure 2:
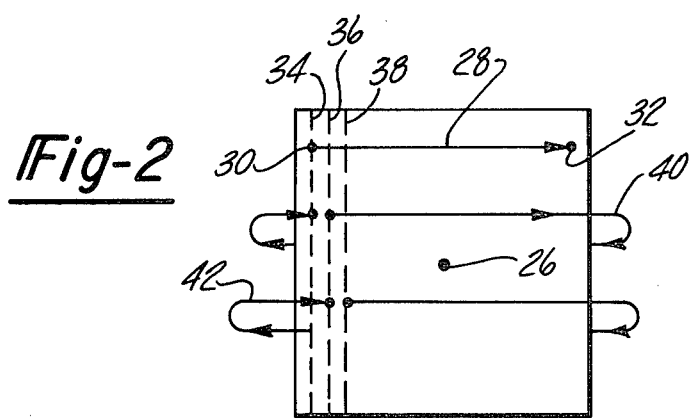
FIG. 2 shows a plan view of the Scan Memory 12 in which the image data is stored.

FIG. 2 shows a plan view of the Scan Memory 12 in which the image data is stored on a pixel by pixel basis in a plurality of storage elements disposed along parallel rows and columns. In its initial state the map data is stored in the Scan Memory 12 symmetrically about a storage element such as storage element 26, which represents the desired map center. Storage element 26 may represent the current coordinate position of the vehicle, or may represent a point displaced from the vehicle's coordinate position so that the major portion of the stored map data corresponds to an area in front of the vehicle.

In a non-rotated display, the Address Generator 16 will generate sequential addresses along each row, one row at a time, starting with the first storage element in the upper left corner and ending with the last pixel in the lower right corner.

Each scan line will begin with a storage element, such as storage element 30 in the first column 34 and end with storage element 32 in the last column, as indicated by scan line 28. When the vehicle moves, for example to the right, by distance corresponding to the distance between adjacent storage elements, the desired map center will also be displaced to the right by one storage element. To maintain the desired relationship between the data stored in the Scan Memory 12 and the desired map center, it now becomes necessary to update the map data stored in the Scan Memory with new data extracted from the Mass Memory 10 representing the map data to the right of the map data currently stored in the Scan Memory 12. One way to accomplish this is to shift all the map data currently being stored, one storage element to the left and add the new map data to the column on the right edge of the Scan Memory. This approach is relatively time consuming, therefore it is easier and quicker to update the Scan Memory 12 using a wrap-around technique in which the Scan Memory is updated by inserting the new map data into the column of storage elements which are storing map data no longer required to maintain the relationship between desired map center and the stored map data.

In the instant example, when the vehicle moves to the right, the map data stored in storage elements of column 34 are no longer required to maintain the desired relationship. Therefore the new map data is stored in the storage elements along column 34. As a result, the left edge of the map image is now stored in column 36 and the right edge of the map image is stored in column 34. Correspondingly a scan of the updated Scan Memory to refresh the map display being generated by the Display Device 20 will now begin with the storage elements in column 36 and the addresses will be sequentially generated in a wrap-around manner to end with the storage elements in column 34 as indicated by scan line 40.

As the vehicle continues to move towards the right, the Scan Memory will be updated by inserting the next column of new map data into column 36 and the scan of the updated Scan Memory to refresh the map display being generated by the Display Device 20 will now begin with the storage elements in column 38 and end with the storage elements in column 36 as indicated by scan line 42. Correspondingly, if the vehicle moved to the left the Scan Memory would be updated starting with the column at the right edge of memory.

A corresponding wrap-around technique is used to update the data content of the Scan Memory 12 when the vehicle moves in an up or down direction relative to the orientation of the stored map.

In one operational mode of the moving map display system, the displayed portion of the map is rotated so that the vehicle's heading (direction of motion) is always towards the top of the displayed map, independent of the orientation of the map as it is stored in the Scan Memory 12. This type of display with the vehicles heading towards the top the displayed map is hereinafter referred to as a heading-up orientation.

Conventionally the map data is stored in the Scan Memory with a north-up orientation, i.e. the map data corresponding to the northern most part of the displayed map is stored in the storage elements at the top of the Scan Memory. Therefore to achieve a heading-up orientation of the displayed map, the map data in the Scan Memory may be rearranged so that the map data lying along a path normal to the vehicle's direction of motion is stored along the rows of storage elements in the Scan Memory or the scan raster of the Display Device 20 (cathode ray tube) may be rotated as taught Gennetten in U.S. Pat. No. 4,245,321. Alternatively, as disclosed herein, the individual storage locations in the Scan Memory 12 may be addressed along parallel lines normal to the vehicle's heading.

Figure 3:
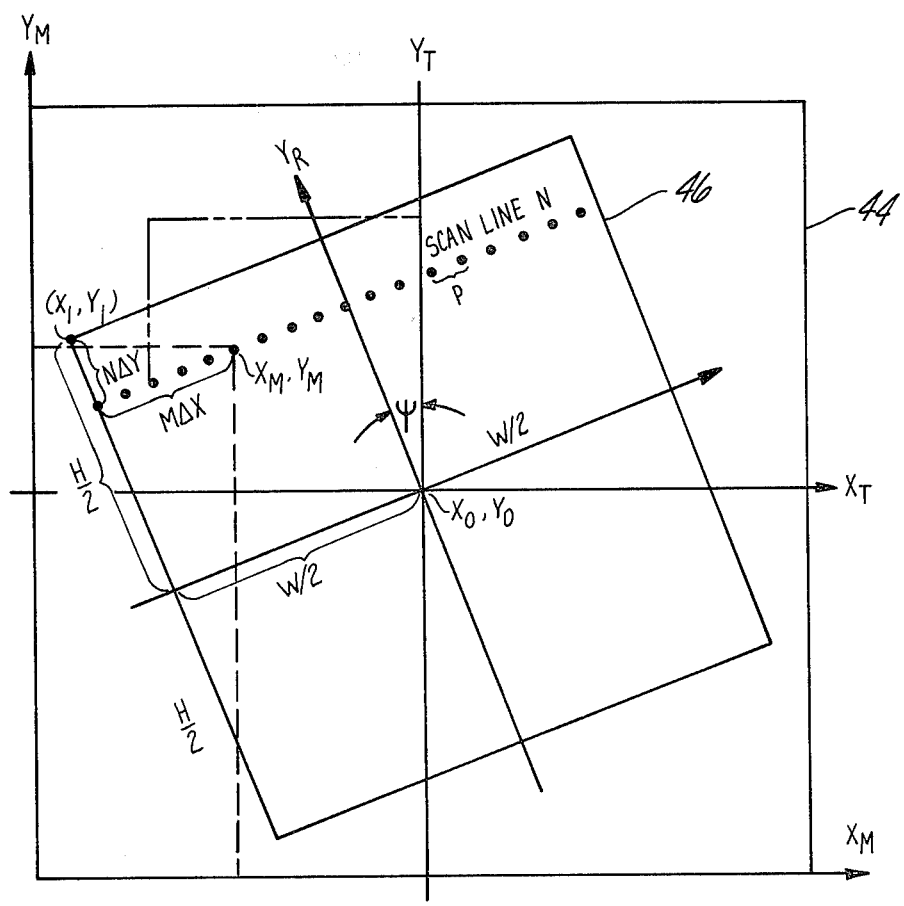
FIG. 3 illustrates the parameters involved in addressing the scan memory 12 along parallel lines normal to the vehicle's heading.

Referring now to FIG. 3, there is shown a graphic illustration of the parameters involved in addressing the Scan Memory 12 along parallel lines normal to the vehicle's heading. The point $X_o, Y_o$ represents the desired map center, the arrow $Y_T$ represents a true north direction, arrow $X_T$ represents a true east direction, and the arrow $Y_R$ represents the vehicle's heading which is at an angle $\psi$ with respect to $Y_T$. The scan lines N, are disposed at the same angle $\psi$ with respect to the rows of storage elements in the memory. The area framed by rectangle 44 represents the total area of the Scan Memory 12 while the area framed by rectangle 46 represents the area within the Scan Memory which is to be displayed. As previously discussed, the storage elements of the Scan Memory 12 are arranged along rows parallel to $X_T$ and columns parallel to $Y_T$. The storage location designated $X_I, Y_I$ represents the address of the storage element where a scan of the Scan Memory 12 is to begin to output the map data encompassed by block 46, and the storage element $X_M, Y_M$ represents the Mth storage element along a scan line N normal to the vehicle's heading $Y_R$.

The address of the initial storage element $X_I, Y_I$ is computed from the equations:

$$X_I = X_o - (W \cos \psi + H \sin \psi)/2 \quad (1)$$

and $$Y_I = Y_o - (H \cos \psi - W \sin \psi)/2 \quad (2)$$

where $X_o$ and $Y_o$ are the addresses of the desired map center, H is the height in pixel elements of the image to be displayed and W is the width in pixel elements of the image to be displayed. The size of each pixel element is equal to the distance between adjacent storage elements of the Scan Memory 12.

The incremental changes to the addresses lying along the scan line N are given by the equations $$\Delta X_I = M(\Delta X \cos \psi) + N(\Delta Y \sin \psi) \quad (3)$$

and $$\Delta Y_I = N(\Delta Y \cos \psi) - M(\Delta X \sin \psi) \quad (4)$$

where $\Delta X$ and $\Delta Y$ are the distances between adjacent storage elements along the rows and columns respectively, M is the pixel number along a given scan line number.

The address of the storage element containing the map data to be displayed are given by the equations.

$$X_M = X_I + \Delta X_I = X_I + M(\Delta X \cos \psi) + N(\Delta Y \sin \psi) \quad (5)$$

$$Y_M = Y_I + 66\ Y_I = Y_I + N(\Delta Y \cos \psi) - M(\Delta X \sin \psi) \quad (6)$$

As shown the size of the Scan Memory 12 must be sufficient to permit the scan area represented by rectangle 46 to be rotated within its perimeter.

The Update and Control Computer 14 receives from an external source, such as an aircraft flight control system information indicative of the vehicle's coordinate position and its heading ($\psi$) with respect to true north. From this information the computer computes the address $X_o, Y_o$ corresponding to the desired map center. It then computes the address $X_I, Y_I$ in accordance with equations (1) and (2) and the incremental correction parameters $\Delta X \cos \psi$, $\Delta Y \sin \psi$, $\Delta Y \cos \psi$ and $-\Delta X \sin \psi$ as they appear in equations (3) and (4). The incremental correction parameters $X_I, Y_I, \Delta X \cos \psi$, $\Delta Y \sin \psi$, $\Delta Y \cos \psi$, and $\Delta X \sin \psi$ are transmitted to the Address Generator 16 which thereafter computes the sequential addresses for the storage elements containing the map data to be displayed in synchronization with the horizontal and vertical scan signal being generated for the Display Device 20. While the Address Generator 16 is generating the addresses, the Update and Control Computer 14 computes a new desired map center, determines if the Scan Memory should be updated and if so prepares the data previously extracted from the Mass Memory 10 for transfer, then computes the parameters for the Address Generator 16 which will enable it to generate the addresses where the update data is to be stored in the Scan Memory 12. It also generates the scan parameters for the next scan of the Scan Memory to refresh the Display Device 20.

The details of the Address Generator 16 are shown on FIG. 4. The Address Generator 16 comprises four input Registers 100, 102, 104 and 106. Registers 100 and 104 receive respectively, the starting X address $X_I$ and the incremental row correction value $\Delta Y \sin \psi$ and starting Y address $Y_I$ and the incremental row correction value $\Delta Y \cos \psi$ directly from the Update and Control Computer 14. Registers 102 and 106 receive respectively the incremental column correction values $\Delta X \cos \psi$ and $\Delta X \sin \psi$ for generating the X and Y addresses.

The output of Register 100 is connected to the input of Register 116 through an Adder 108. The output of Register 116 is connected to an input of Adder 108 and an input of Adder 124. In a like manner the output of Register 102 is connected to the input of a Register 118 through an Adder 11. The output of Register 118 is connected to an input of Adder 110 and the other input of Adder 124. The output of Adder 124 is the X address.

Correspondingly, the outputs of Register 104 and 106 are connected to Registers 120 and 122, respectively through Adders 112 and 114. The outputs of Registers 120 and 122 are connected back to the inputs of Adders 112 and 114, respectively and to the inputs of Adder 126. The output of Adder 126 is the Y address.

The ten most significant bits of Adders 124 and 126 are connected to the address lines of Scan Memory 12 as the X and Y address for accessing the storage elements while loading new data to update the Scan Memory or outputing map data to refresh the image being produced by the Display Device 20.

A strobe Address Decoder 125 generates a series of strobe signals in response to predetermined addresses appearing on the address bus of the Update and Control Computer 14. These strobe signals when activated load the values on the Update and Control Computer data bus into the various registers in the Address Generator as indicated. A Mode Register 127 generates mode signals indicative of the operational mode of the address generator used elsewhere in the system.

The operation of the Address Generator 16 is as follows: The Strobe Address Decoder 125 generates register strobe signals R0STB, R1STB R2STB R4STB R5STB R6STB, INCSTB, and MODE STB plus a master clear strobe signal MCLR in response to predetermined control addresses being present on the Update and Control Computer's address bus, thereby coordinating the operation of the Address Generator 16 with the Update and Control Computer 14.

In order to initially transfer the map data from the Mass Memory 10 to the Scan Memory 12, the Update and Control Computer 14 provides initialization parameters to the Address Generator 16 so as to operate it in the initial load mode. Map data is transferred to the Scan Memory in columns of data blocks of a predetermined size. For example each block of data may contain a $32 \times 32$ matrix of map data bits. A master clear (MCLR) clears the contents of all the registers and initiates the initial load mode after the Address Generator has been strobed for the initial load (I) mode by the mode strobe signal MODE STB. The start X address $X_I$ is loaded into Register 100 by the strobe signal R0STB and transferred to Register 116 by strobe signal R1STB. The start Y address $Y_I$ having a value of $\emptyset$ is loaded into Register 104 by the strobe signal R4STB and transferred into Register 120 by the strobe signal R5STB. The incremental value $\Delta X \cos \psi$ having a value of 1.0 is loaded into Register 102 by the strobe signal R2STB. The incremental value $-\Delta X \sin \psi$ having a value of $\emptyset$ is loaded into Register 106 by the strobe signal R6STB.

Once the Address Generator 16 is initialized by the Update and Control Computer 14 for the initial load mode, Registers 118 and 122 are clocked by the Pixel strobe signals. The X address is initialized to be incremented so that the first row of 32 map data bits from the first block of map data is loaded into the Scan Memory. The next row of map data bits is loaded by detecting modulo 32 at the output of Register 118. This detection generates a strobe signal clearing Regiser 118 and causes Register 120 to be clocked by R5STB so as to increment the Y address by 1. This procedure continues until modulo 32 is detected at the output of Register 118 and a number 1 larger than the number of storage elements in a column is detected at the output of Adder 126. This detection causes Registers 118 and 120 to be cleared and Registers 116 to be incremented by 32 which was loaded into Register 100 from the Update and Control Computer 14 and transferred to Register 116 in response to R1STB. The addressing then again starts at the top of the Scan Memory and another column of blocks is loaded into the Scan Memory. This process continues until all of the required columns of blocks are loaded into the Scan Memory 12.

The operation of preparing the Address Generator for the "refresh mode" is initiated by a master clear strobe (MCLR) signal which clears Registers 116, 118, 120 and 122. The Update and Control Computer 14 places on the data bus the 16-bit value of the X start address $X_I$. The register strobe signal R0STB will be generated and Register 100 will be enabled and the X start address will be stored. The content of Register 100 is added to the content of Register 116 in Adder 108. Since Register 116 was cleared by the master clear strobe (MCLR), the address at the output of Adder 108 is the X-axis start address $X_I$. The X-axis start address is subsequently stored in Register 116 in response to the strobe signal R1STB. The output of Register 116 is added to the content of Register 118 in Adder 124. At this point in time the content of Register 118 is still zero as a result of the master clear strobe (MCLR), therefore the output of Adder 124 is the computer generated X-axis start address $X_1$.

The Update and Control Computer will next place the 16 bit value of the Y-axis start address $Y_I$ on the data bus. This value will be stored in Register 104 in response to the strobe signal (R4STB) and Register 120 in response to the strobe signal (R5STB). In a like manner, the output of Adder 126 will be the computer generated Y-axis start address $Y_I$.

The ten (10) most significant bits of Adders 124 and 126 are applied to the address lines of Scan Memory 12 and address the first storage element in the Scan Memory where the scan begins.

The Update and Control Computer will then sequentially place the incremental column correction values $\Delta X \cos \psi$, and $-\Delta X \sin \psi$ for the generation of the addresses along the scan lines into Registers 102 and 106 respectively in response to sequentially generated strobe signals R2STB and R6STB. The incremental row correction values $\Delta Y \sin \psi$ and $\Delta Y \cos \psi$ are placed respectively in Registers 100 and 104 in response to sequentially generated strobe signals R0STB and R4STB.

The generation of the sequential address along a scan line will begin with the generation of the pixel strobe (PIXSTB) signals by the Scan Timing Generator 22 which respectively enable Registers 118 and 122. The Scan Timing Generator 22 will generate a number of pixel strobe signals equal to the number of picture elements to be displayed along each horizontal scan line N of the Display Device 20. For example if there are 512 pixels along each horizontal line of the Display Device 20, the Scan Timing Generator will generate 512 consecutive pixel strobe signals. Each pixel strobe signal will add the content of Register 102 to the content of Register 118 so that the content of Register 118 will be a column address correction having a value M ($\Delta X \cos \psi$) where M is the number of pixel strobe signals received. Likewise each pixel strobe signal will add the content of Register 106 to the content of Register 122 so that the content of Register 122 will be a row address correction having a value $-M (\Delta X \sin \psi)$.

The content of Registers 116 and 118 are added in Adder 124 to generate a new X-axis address in response to each pixel strobe signal. In a like manner, the content of Registers 120 and 122 are added in Adder 126 to generate a new Y-axis address in response to each pixel strobe signal. After the Scan Timing Generator 22 generates the predetermined number of pixel strobe signals, it generates the line strobe (LINESTB) signal. The line strobe signal clocks Registers 116 and 120 and clears Registers 118 and 122. The strobing of Register 116 causes it to store the sum of its prior content plus the incremental value ($\Delta Y \sin \psi$) stored in Register 100. The content of Register 116 now becomes a line corrected column address having a value $X_I + N(\Delta Y \sin \psi)$. In a like manner, the strobing of Register 120 cause it to store the sum of the content of Register 120 plus the incremental value $\Delta Y \cos \psi$ stored in Register 104. The content of Register 120 now becomes a line corrected row address having a value $Y_I + N(\Delta Y \cos \psi)$.

Since Registers 118 and 122 were cleared by the line strobe signal, the output of Adders 124 and 126 are the new starting X and Y addresses for the next sequential (Nth) scan line. The Scan Timing Generator 22 will again generate a series of pixel strobe signals equal to the number of pixels in a scan line. Adders 124 will sum the content of Registers 116 and 118 and its output will be $X_I + M(\Delta X \cos \psi) + N (\Delta Y \sin \psi)$ as given in equation (5). Likewise Adder 126 will sum the content of Registers 120 and 122 and its output will be $Y_I + N(\Delta Y \cos \psi) - M (\Delta X \sin \psi)$ as given in equation (6). This process will continue until the X and Y addresses for each pixel in the video field of the Display Device 20 is generated.

The Update and Control Computer 14 will update, if required, the image data content of the Scan Memory 12 with new data from the Mass Memory 10 at the end of each field during the period when the Scan Timing Generator 22 is generating a vertical blanking signal for the Display Device. When the Scan Memory 12 needs to be updated, the Update and Control Computer will place the Address Generator 16 in the Update Mode, execute a master clear strobe, and generate the starting X and Y axis addresses of the column or row in which the new data is to be added. The X-axis starting address will then be stored in Register 100 in response to the strobe signal RØSTB. Likewise the Y-axis starting address will be stored in Register 104 in response to the strobe signal R4STB. These starting address will then be transferred to Registers 116 and 120 in response to strobe signals R1STB and R5STB respectively.

Incremental values indicative of the difference between address locations are then stored in Registers 102 and 106 in response to strobe signals R2STB and R4STB. For a row update, Register 102 and 106 are loaded with the values 1 and Ø respectively. This results in only the X addresses being incremented as the row of map data is loaded into the Scan Memory from the Update and Control Computer 14.

For a column update Registers 102 and 106 are loaded with the values Ø and 1 respectively. This results in only the Y addresses being incremented as the column of map data is loaded into the Scan Memory.

For the row or column updates the Update and Control Computer accesses and stores in a sequential manner the map data in Register Buffers as obtained from the Row or Column Buffer which it previously obtained from the Mass Memory 10. The updating of a row or column, as previously described will take place during the vertical retrace of the Display Device 20 between successive fields of displayed map data.

When the Display Device 20 has a scan pattern comprising two interlaced fields of map data extracted from the Scan Memory, the Update and Control Computer in the Refresh Mode will generate incremental values of 2 $\Delta Y \sin \psi$ and 2 $\Delta Y \cos \psi$ which are entered into Registers 100 and 104 respectively. This will cause the Address generator to skip a scan line during the generation of the Y addresses. In this case the starting X any Y addresses for second field will be displaced one line from the starting address of the first frame.

In an alternate mode of operation, the size of the displayed image may be increased by a Zoom signal. The Zoom signal may have predetermined fixed values or may be variable between predetermined limits. In this case the incremental values generated by the Update and Control Computer 14 and stored in Registers 100, 102, 104 and 106 will be $(1/\text{Zoom}) \Delta Y \sin \psi$, $(1/\text{Zoom}) \Delta X \cos \psi$, $(1/\text{Zoom}) \Delta Y \cos \psi$, and $(-1/\text{Zoom}) \Delta X \sin \psi$ respectively. When the scan pattern of the Display Device comprises two interlaced fields, the Update and Control Computer will generate the incremental values $(2/\text{Zoom}) \Delta Y \sin \psi$ and $(2/\text{Zoom}) \Delta Y \cos \psi$ to be stored in Registers 100 and 104 respectively. Correspondingly, the Update and Control Computer will generate the X and Y axis starting address compensating for the reduced area 46 of the Scan Memory to be accessed by the generated addresses to maintain the relationship between the displayed image and the coordinate position of the vehicle.

Having disclosed the address generator in the context of a particular application, it is not intended to limit the invention to that particular application. Persons skilled in the art will be able to employ the disclosed address generator to various other applications where it is desirable or necessary to rotate and/or change the size of the image displayed. It is further intended that the disclosed address generator not be limited to the exact circuit shown. It is submitted that those skilled in the art will be able to develop alternate circuits capable of performing the same functions without departing from the spirit of the invention as disclosed herein and set forth in the appended claims.

What is claimed is:

1. An Address generator for generating addresses enabling a memory device, having memory elements arranged along orthogonal rows and columns to store data and to output stored data in a predetermined sequence in response to X and Y starting addresses and first and second incremental X and Y correction values received from a computer characterized in that such address generator comprises:

first means for repetitively adding the first incremental Y correction value to the X starting address to generate a row corrected X starting address having a value equal to said X starting address plus N times said first incremental Y value where N is the row number second means for repetitively adding the first incremental X correction value to itself to generate a first address correction having a value equal to M times the first incremental X correction value where M is the column number;

third means for summing said row corrected X starting address with said first X address correction to generate X addresses;

fourth means for repetitively adding the second incremental Y correction value to said Y starting address to generate a row corrected Y starting address having a value equal to the Y starting address plus N times the second incremental Y correction value where N is the row number;

fifth means for repetitively adding the second incremental X correction value to itself to generate a second address correction having a value equal to M times incremental X correction value where M is the column number; and sixth means for summing said line corrected Y address with said second address correction to generate Y addresses.

2. The address generator of claim 1 characterized in that the address on the computer's address bus is indicative of the data present on the computer's data bus, said first means comprises:

first register means connected to the computer's data bus for sequentially receiving and storing the X starting address and the first incremental Y correction value generated by the computer in response to a first and third register signal respectively;

second register means for temporarily storing said X starting address in response to a second register signal and said line corrected X starting address in response to the line signal; and a first adder connected between said first and second register means for summing the content of said first and second register means upon the occurrence of each line signal to generate said line corrected X starting address stored in said second register means; and wherein said second means comprises:

third register means connected to the computer's data bus for receiving and storing said first incremental X correction value in response to a fourth register signal;

fourth register means storing said first address correction in response to said pixel signals; and a second adder connected between said third and fourth register means for repeatedly summing the content of said third and fourth register means upon the occurrence of each pixel signal to generate said first address correction stored in said fourth register means;

decoder means responsive to the address on the computer's address bus for generating said first, second, third and fourth register signals in a predetermined sequential order; and timing signal generator means for repetitively generating said pixel signals and for generating said line signal after the generation of a predetermined number of pixel signals.

3. The address generator of claim 2 characterized in that the address in the computer's address bus is indicative of the data present on the computer's data bus, said fourth means comprises:

fifth register means connected to the computer's data bus for sequentially receiving and storing the Y starting address and the second incremental Y correction value generated by the computer in response to a fifth and seventh register signal respectively;

sixth register means for temporarily storing said Y starting address in response to a sixth register signal and said line corrected Y starting address in response to said line signals;

a third adder connected between said fifth and sixth register means for summing the content of said fifth and sixth register means upon the occurrence of each line signal to generate said line corrected Y starting address stored in said sixth register means; and wherein said fifth means comprises:

seventh register means connected to the computer's data bus for storing the second incremental X correction value generated by the computer in response to an eighth register signal;

eighth resister means for storing said second address correction in response to said pixel signals;

a fourth adder connected between said seventh and eighth register means for repeatedly summing the content of said seventh and eighth register means upon the occurrence of each pixel signal to generate said second address correction stored in said eighth register means; and wherein said decoder means is further responsive to the address on the computer's address but for generating said fifth, sixth seventh and eighth register signals in a predetermined sequential order.

4. The address generator of claims 1 or 3 characterized in that said memory has a plurality of memory elements disposed at the intersections of orthogonal rows and columns and wherein ΔX is a distance between adjacent storage elements along said rows, and ΔY is a distance between adjacent storage elements along said columns and ψ is an angular displacement of the parallel lines along which the addresses are to be generated, where the angle ψ is measured with respect to said rows, the computer generates said first and second incremental X values according to the equations said first incremental X value = kΔX cos ψ said second incremental X value = −kΔX sin ψ and generates said first and second incremental Y values according to the equations:

said first incremental Y value = KΔY sin ψ said second incremental Y value = KΔY cos ψ where k and K are predetermined constants.

5. In combination with a memory having a plurality of storage elements disposed along orthogonal rows and columns and a computer generating X and Y starting address, first and second incremental X correction values, and first and second incremental Y correction values, an address generator for generating addresses for the memory's storage elements lying along parallel lines disposed at an angle with respect to the rows, comprising:

means for repetitively generating sets of pixel strobe signals, each set containing a predetermined number of pixel strobe signals and for repetitively generating a line strobe signal at the end of each set of pixel strobe signals;

first means for repetitively adding the first incremental Y correction value to said X starting address in response to said line strobe signals to generate a line corrected X starting address;

second means for repetitively adding the first incremental X correction value to itself in response to said pixel strobe signals to generate a first pixel number correction;

first adder means for summing said line corrected X starting address with said first pixel number correction to generate sequential addresses for the columns of stroage elements;

third means for repetitively adding the second incremental Y correction value to said Y starting address in response to said line strobe signals to generate a line corrected Y starting address;

fourth means for repetitively adding the second incremental Y correction value to itself in response to said pixel strobe signals to generate a second pixel number correction; and second adder means for summing said line corrected Y starting address with said second pixel number correction to generate addresses along said rows of storage element.

6. The address generator of claim 5 wherein the computer has an address bus and a data bus and wherein the address currently on the address bus is indicative of data on the data bus and wherein said address generator further includes a decoder for generating a set of register strobe signals in a predetermined sequence, said first means comprises:

a first register, connected to said data bus for sequentially receiving and storing the X starting address and the first incremental Y correction value in response to a first and third register strobe signal;

a second register connected to said data bus for receiving and storing said X starting address in response to a second register strobe signal and said line corrected X address in response to said line strobe signal; and third adder means connected between said first and second register for summing the content of said first and second registers to generate said line corrected X addresses stored by said second register; and wherein said second means comprises:

a third register connected to said data bus for storing said first incremental X correction value in response to a fourth register stroble signal;

a fourth register for storing said first pixel correction value in response to said pixel strobe signals;

fourth adder means connected between said third and fourth registers for summing the content of said third register with the content of said fourth register to generate said first pixel correction value stored by said fourth register; and wherein said third means comprises:

a fifth register connected to said data bus for sequentially receiving and storing said Y starting address and incremental Y correction value in response to a fifth and seventh register strobe signals respectively;

a sixth register for storing said Y starting address in response to a sixth register strobe signal and for storing said line corrected Y address in response to said line strobe signal;

fifth adder means connected between said fifth and sixth registers for adding the content of said fifth register to the content of said sixth register to generate said line corrected Y address stored by said sixth register; and wherein said fourth means comprises:

a seventh register connected to said data bus for storing said second incremental X correction value;

an eighth register for storing said second pixel correction value in response to said pixel strobe signals; and fourth adder means connected between said seventh and eighth registers for summing the content of said seventh register to the content of said eighth register to generate said pixel strobe signal stored by said eighth register.

7. The address generator of claim 6 wherein said memory has a plurality of storage elements disposed at the intersections of orthogonal rows, columns and wherein $\Delta X$ is a distance between adjacent storage elements along said rows and $\Delta Y$ is a distance between adjacent storage elements along said columns and wherein $\psi$ is an angular displacement of the parallel lines along which the addresses are to be generated; the computer generates said first and second incremental X correction values according to the equations:

first incremental X correction value = $\Delta X \cos \psi$ second incremental X correction value = $-\Delta X \sin \psi$ and generates said first and second incremental Y correction values according to the equations:

first incremental Y correction value = $\Delta Y \sin \psi$ second incremental Y correction value = $\Delta Y \cos \psi$.

8. A method for generating addresses for a memory having a plurality of storage elements disposed along orthogonally arranged rows and columns wherein said addresses are along a set of parallel lines disposed at an angle $\psi$ with respect to said rows said method comprising the steps of:

generating a row and column starting address in response to a signal indicative of the angle $\psi$;

generating a first and second incremental column correction value and a first and second incremental row correction value in response to said signal indicative of the angle $\psi$;

repetitively generating sets of pixel strobe signals, each set comprising a predetermined number of strobe signals;

detecting the last pixel strobe signal in each set to generate a line strobe signal;

repetitively summing said first incremental row correction value to said column starting address in response to said line strobe signals to generate a line corrected column address;

repetitively summing said first incremental column correction value to itself in response to said pixel strobe signals to generate first pixel address corrections;

adding said line corrected column address to each of said first pixel address corrections to generate said column addresses;

repetitively summing said second incremental row correction value to said row starting address in response to said line strobe signals to generate a line corrected row address;

repetitively summing said second incremental column correction value to itself in response to said pixel strobe signals to generate second pixel address corrections; and adding said line corrected row address to each of said second pixel address correction to generate said row address.

9. The method of claim 8 wherein the adjacent storage elements along said rows are separated by a distance $\Delta X$ and the adjacent storage elements along said columns are separated by a distance $\Delta Y$, said step of generating said first and second incremental column correction values and said first and second incremental row correction values comprises the steps of:

computing said first incremental column correction value having a value equal to $k\Delta X \cos \psi$;

computing said incremental column correction value having a value equal to $-k\Delta X \sin \psi$ where k is a first constant;

computing said first incremental row correction value having a value equal to $K\Delta Y \sin \psi$; and computing said second incremental Y correction value having a value equal to $K\Delta Y \cos \psi$ where K is a second constant.

10. The method of claim 9 wherein said first and second constants k and K have a value of 1 where the addresses are to be generated along each of said parallel lines in a sequential order.

11. The method of claim 9 wherein said first constant k has a value of 1 and said second constant K has a value of 2 where the addresses are to be generated along every other of said parallel lines.

12. The method of claim 9 wherein said step of computing said first and second incremental row and column correction values is further responsive to a magnification signal corresponding to a magnification "Z" said steps of computing further computes said first and second constants k and K respectively having a value 1/Z.

13. The method of claim 9 wherein said step of computing said first and second incremental row and column correction values is further responsive to a magnification signal corresponding to a magnification Z said step of computing computes said first and second incremental column addresses wherein said first constant k has a value equal to 1/Z and said steps of computing computes said first and second incremental row correction values wherein said second constant K has a value 1/Z.

14. The method of claim 9 wherein said steps of generating a first and second incremental column correction values and a first and second incremental row correction values are performed by a computer having an address bus and a data bus wherein the address on the address bus is indicative of the incremental row and column correction values on the data bus, said steps of summing to generate said line corrected column address, said first pixel address correction, said line corrected row address and said second pixel address correction comprises the steps of:

decoding the address on said address bus to sequentially generate a set of register strobe signals;

sequentially storing said column starting address and said first incremental row correction value in a first register in response to sequentially generated first and third register strobe signals;

storing said column starting address in a second register in response to a second register strobe signal;

repetitively adding said first incremental row correction value to the content of said second register and storing said value in said second register in response to said line strobe signals to generate said line corrected column address;

storing said first incremental column correction value in a third register in response to a fourth register strobe signal;

adding said first incremental column correction value to the content of a fourth register and storing the result in said fourth register in response to said pixel strobe signals to generate said first pixel address correction;

sequentially storing said row starting address and second incremental row correction value in a fifth regiser to sequentially generated fifth and seventh register strobe signals;

storing said row staring address in a sixth register in response to a sixth register strobe signal;

repetitively adding said second incremental row correction value to the content of said sixth register in response to said line strobe signals to generate said line corrected row addresses;

storing said second incremental column correction value in a seventh register in response to an eighth register strobe signal; and repetitively adding said second incremental column correction value to the content of an eighth register and storing the results in said eighth register in response to said pixel strobe signals to generate said second column address correction.

15. In combination with a memory having a plurality of storage elements disposed along orthogonal rows and columns, an address generator for generating addresses for the memory's storage elements lying along parallel lines disposed at an angle $\psi$ with respect to the rows of storage elements comprising:

means for generating a signal indicative of the angle $\psi$ defining the angular displacement of the parallel lines to the rows of storage elements in the memory;

a computer having adequate storage and computation means for generating column and row starting addresses, first and second incremental column correction values and first and second incremental row correction values in response to the signal indicative of the angle $\psi$;

means for repetitively generating sets of pixel strobe signals, each set containing a predetermined number of pixel strobe signals equal to the number of addresses to be generated along each line;

means responsive to said predetermined number of pixel strobe signals for generating a line strobe signal at the end of each set of pixel strobe signals;

first means for repetitively adding said first incremental row correction value to said column starting address in response to said line strobe signals to generate line corrected column address;

second means for repetitively adding said first incremental column correction value to itself in response to said pixel strobe signals to generate a first column address correction;

third means for adding said first column address corrections to said line corrected column address to generate sequential column addresses;

fourth means for repetitively adding the second incremental row correction value to said row starting address in response to said line strobe signals to generate sequential line corrected row signals;

fifth means for repetitively adding said second incremental column correction value to itself in response to said pixel strobe signals to generate a second column address correction; and sixth means for sequentially adding said second column address correction to said line corrected row address to generate sequential row addresses.

* * * * *